No. 796,406. PATENTED AUG. 8, 1905.
C. H. ANDERSON.
CARGO CONVEYER.
APPLICATION FILED AUG. 8, 1904.
10 SHEETS—SHEET 4.
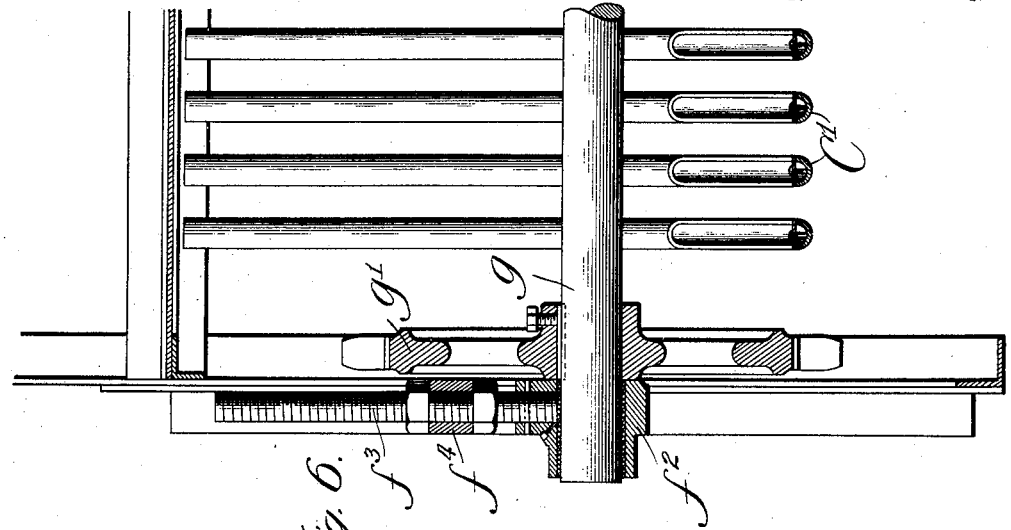
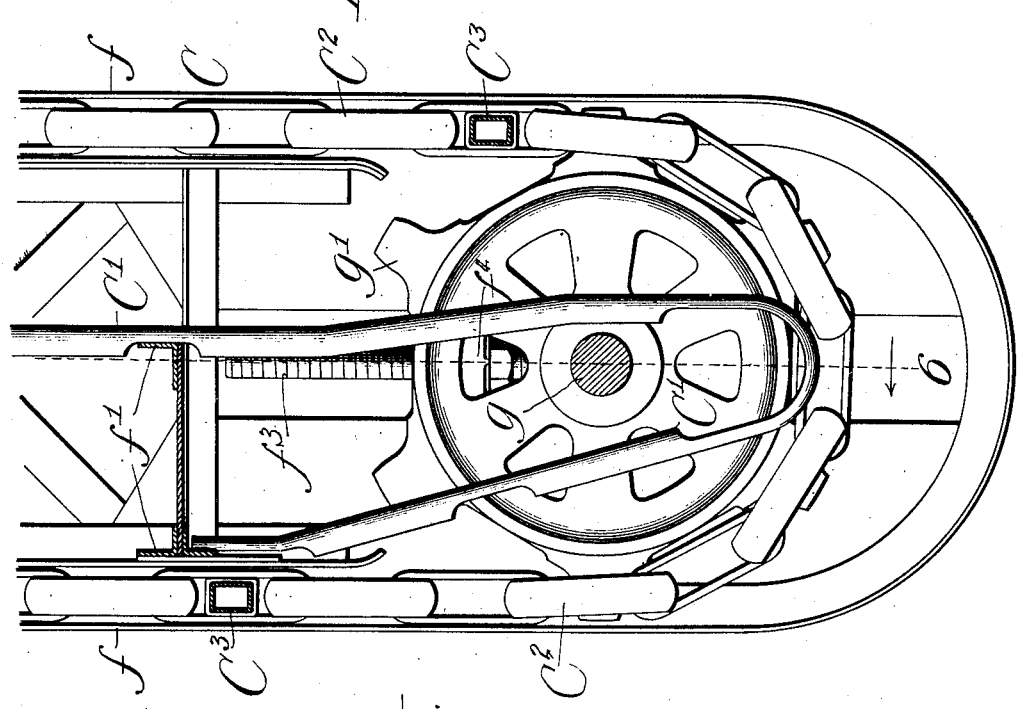
Witnesses:
Inventor:
Charles H. Anderson,
By Dyrenforth, Dyrenforth & Lee,
Att'ys

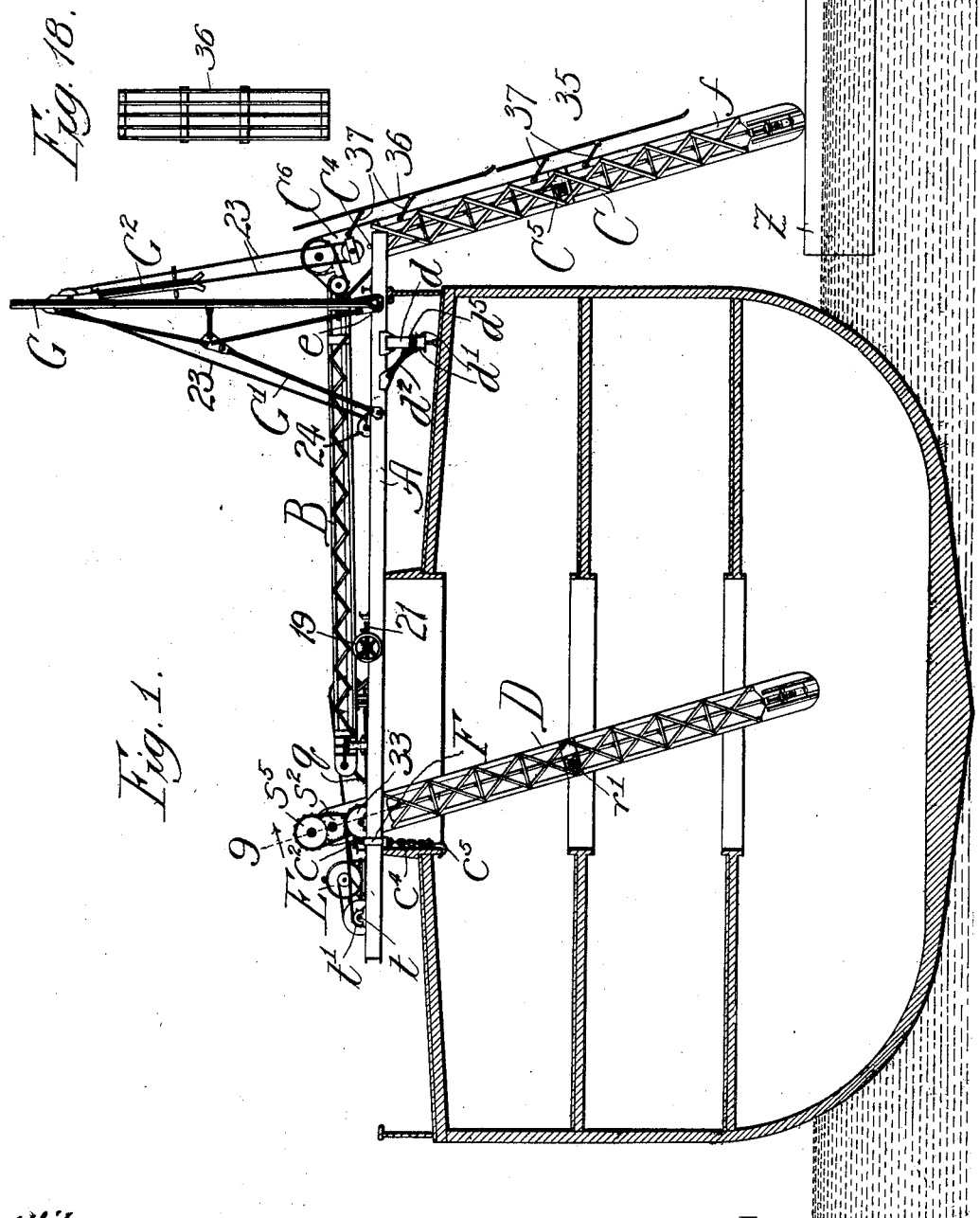

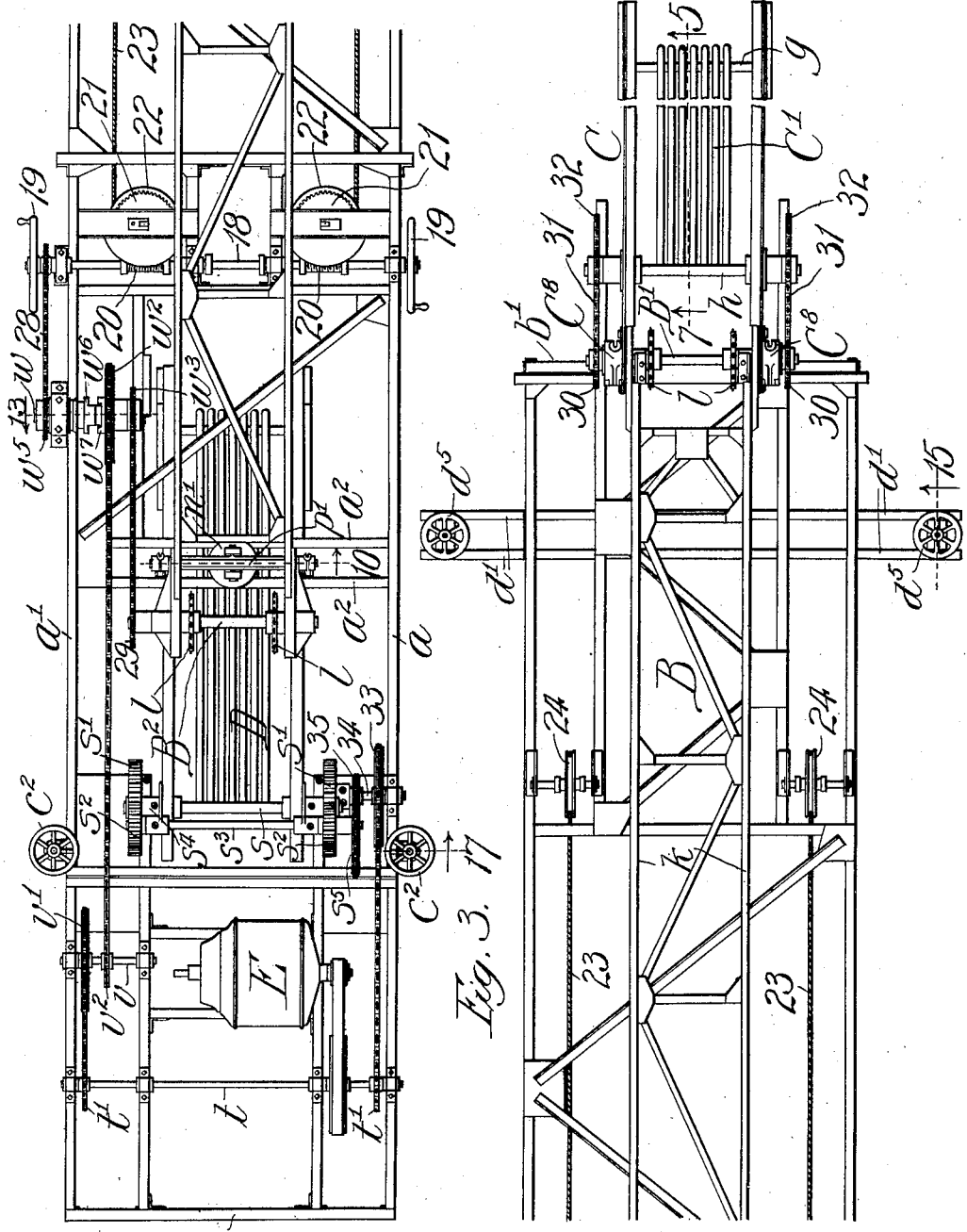

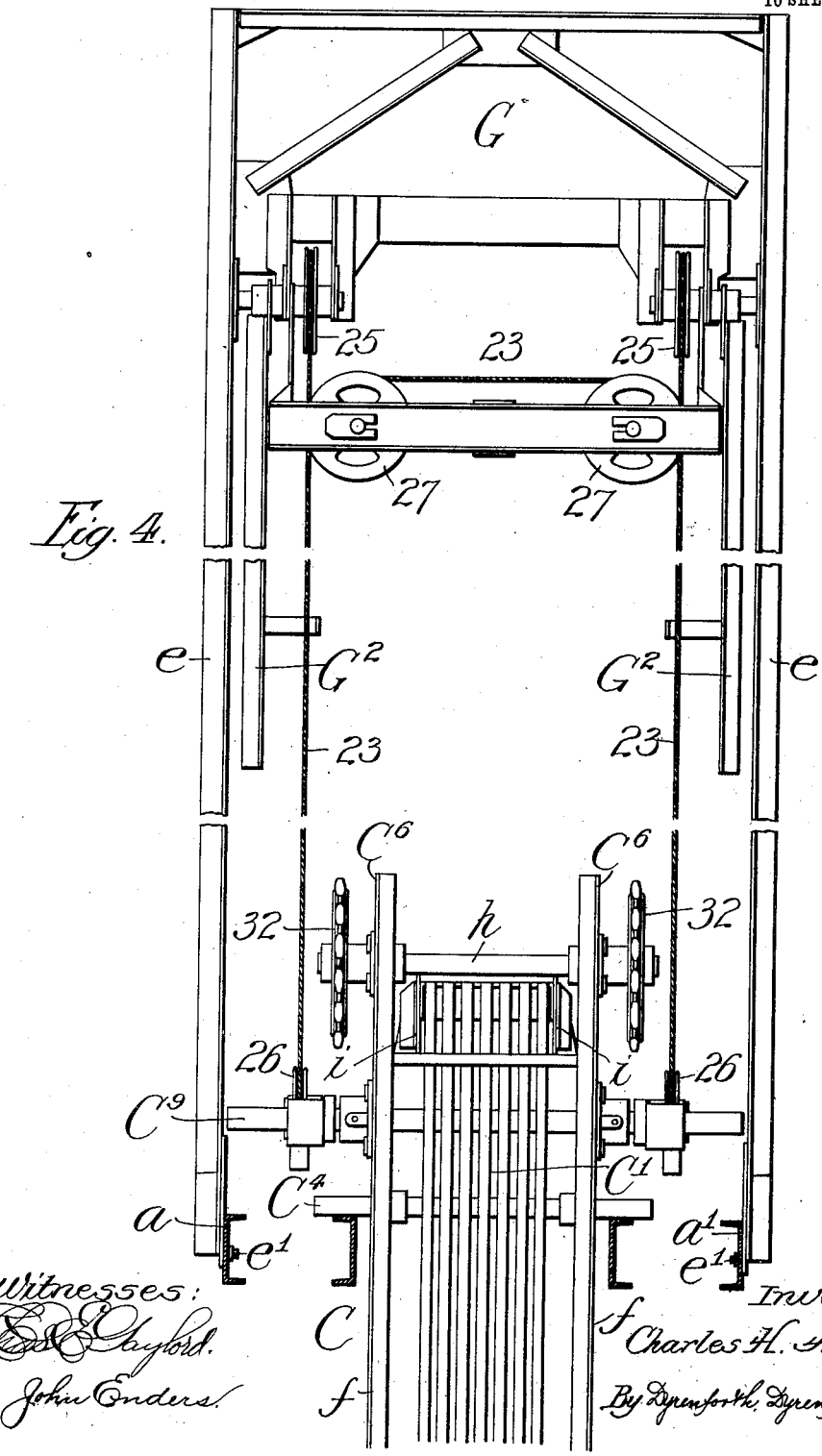

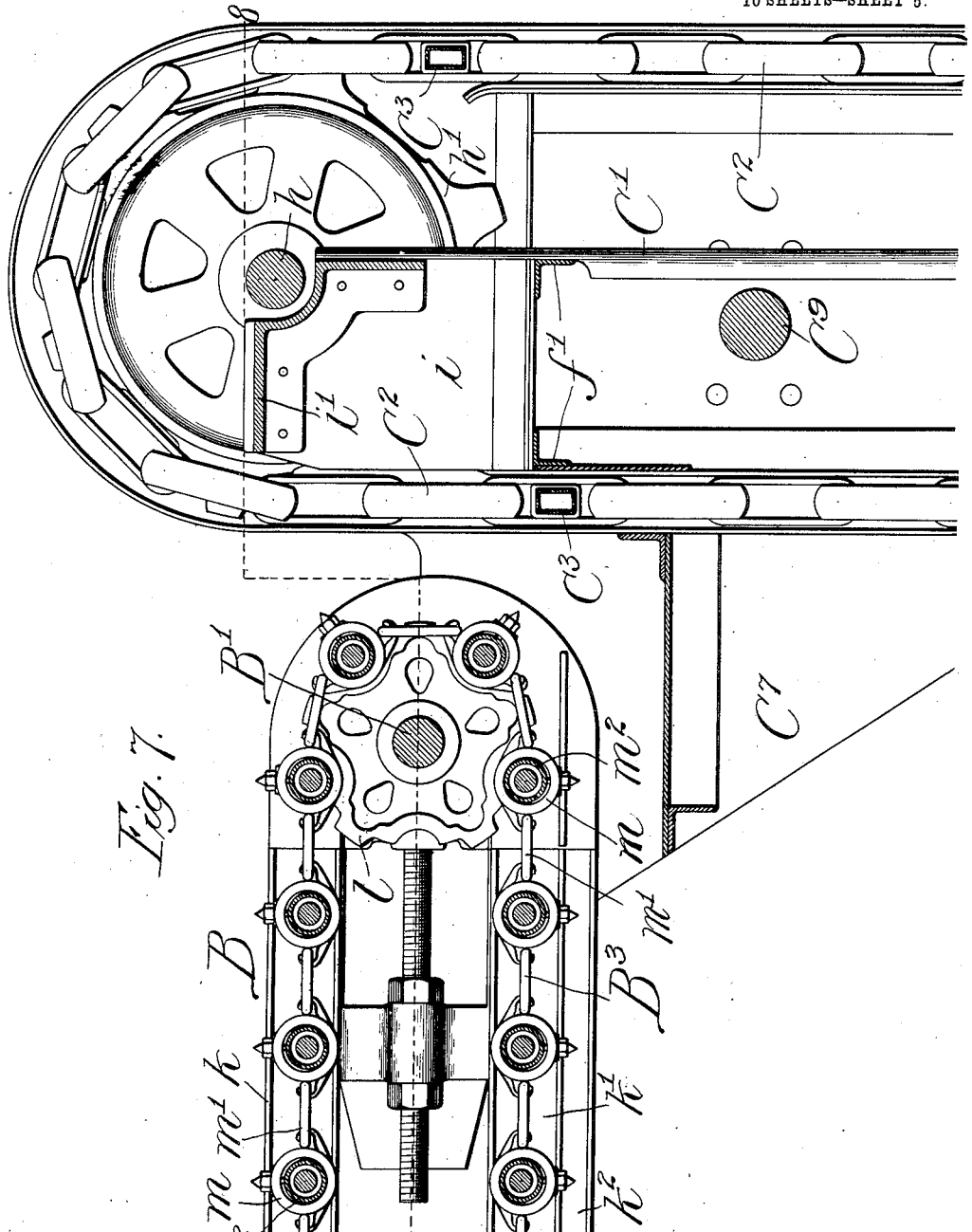

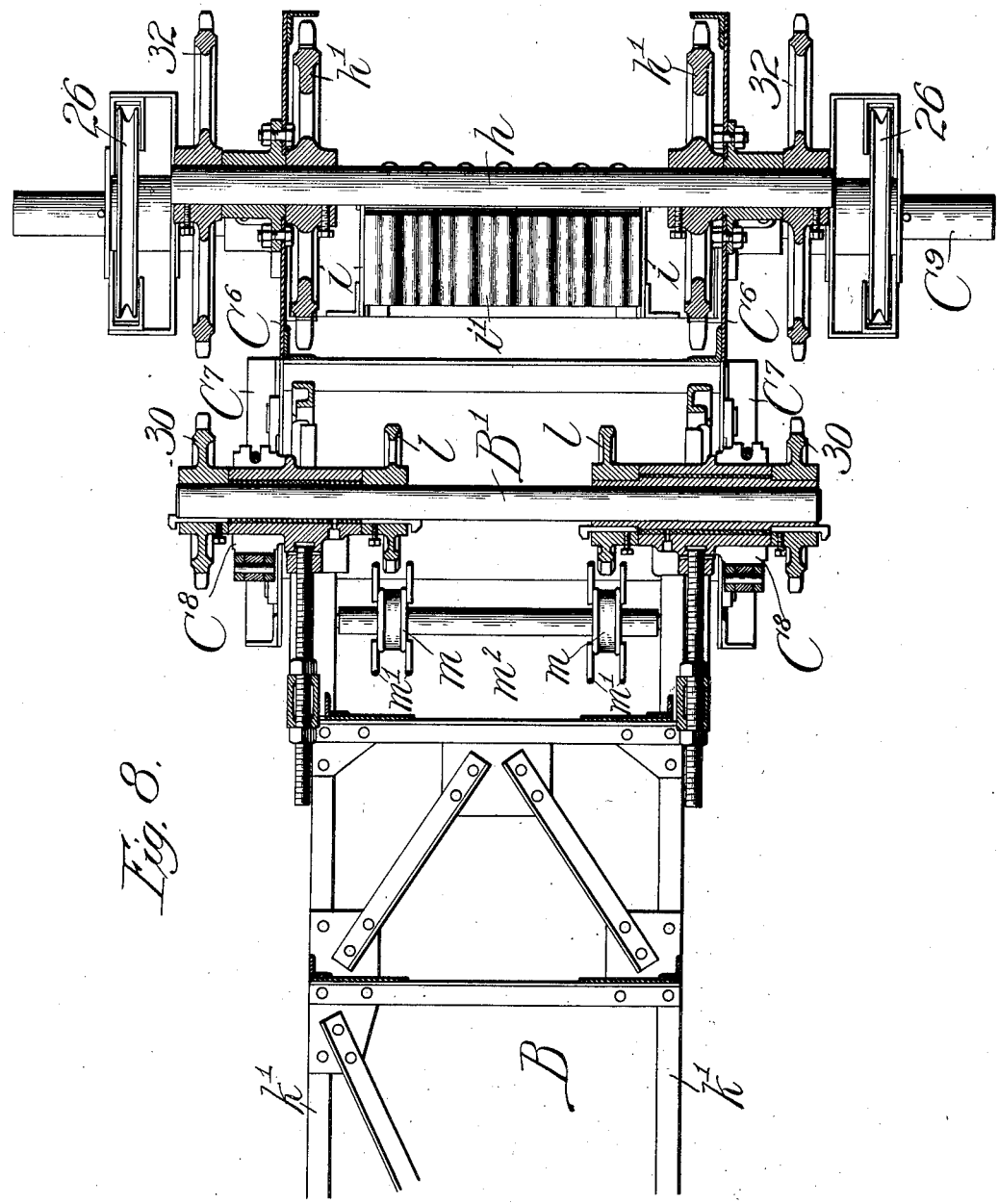

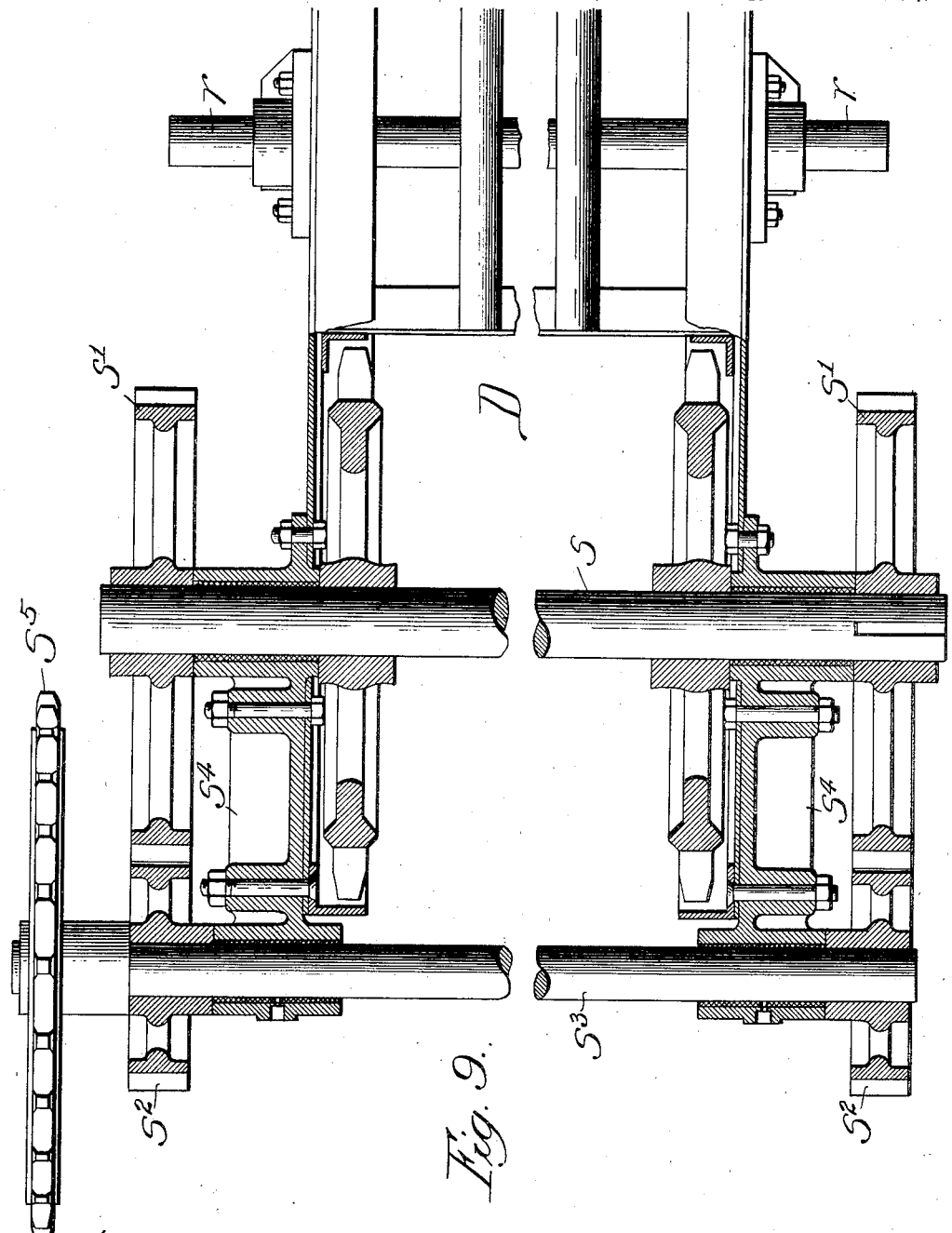

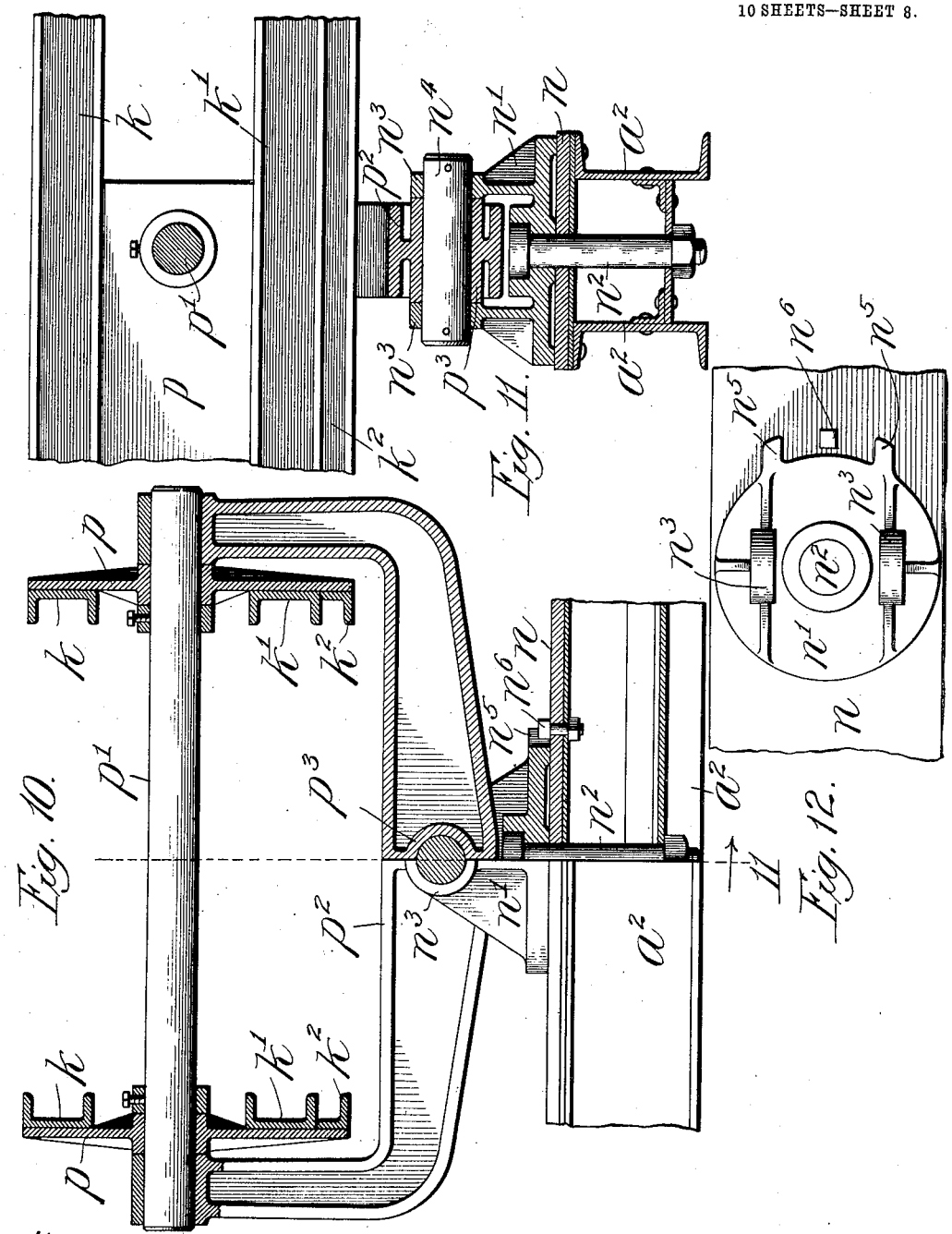

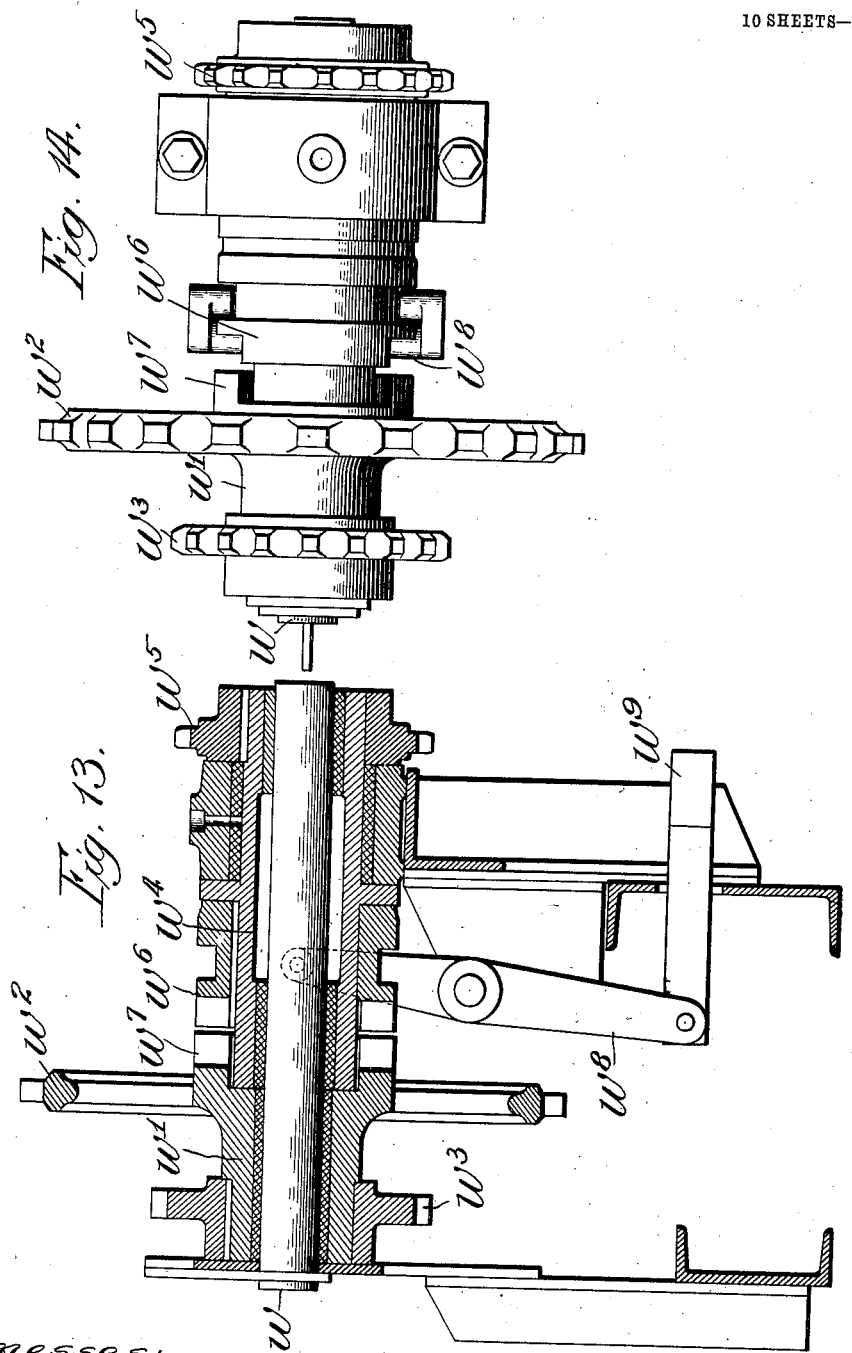

No. 796,406.  
PATENTED AUG. 8, 1905.  
C. H. ANDERSON.  
CARGO CONVEYER.  
APPLICATION FILED AUG. 8, 1904.  
10 SHEETS—SHEET 10.
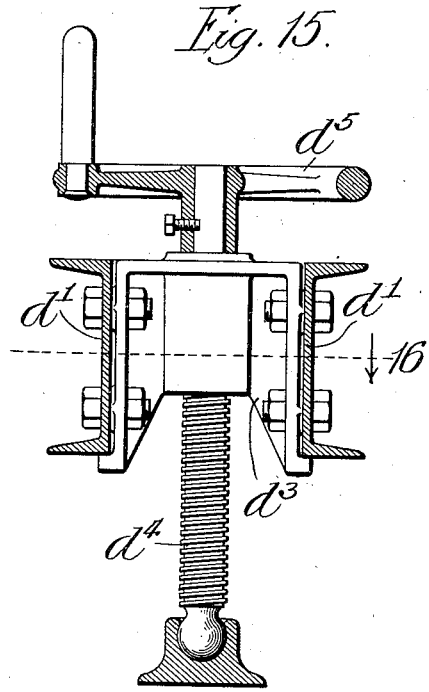
Fig. 15.
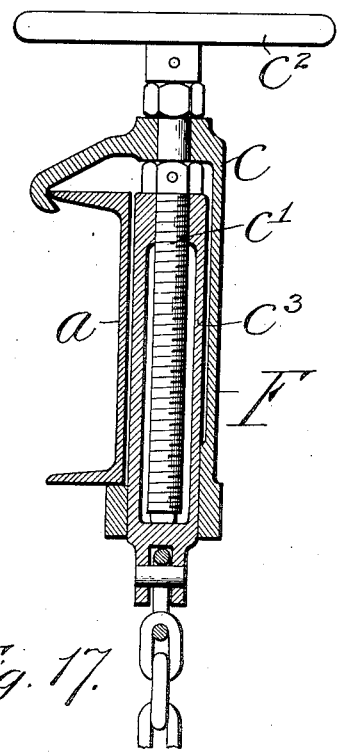
Fig. 17.
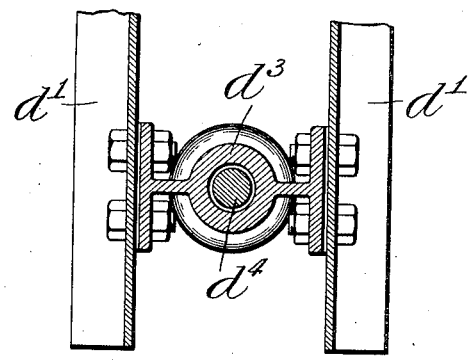
Fig. 16.
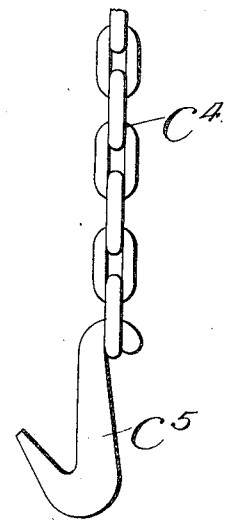
Witnesses:  
Geo. E. Gaylord.  
John Enders.
Inventor:  
Charles H. Anderson,  
By Dyrenforth, Dyrenforth & Lee  
Att'ys

UNITED STATES PATENT OFFICE.

CHARLES H. ANDERSON, OF CHICAGO, ILLINOIS.

CARGO-CONVEYER.

No. 796,406. Specification of Letters Patent. Patented Aug. 8, 1905.

Application filed August 8, 1904. Serial No. 219,898.

*To all whom it may concern:*

Be it known that I, CHARLES H. ANDERSON, a citizen of the United States, residing at Chicago, in the county of Cook and State of Illinois, have invented a new and useful Improvement in Cargo-Conveyers, of which the following is a specification.

This invention relates to improvements in conveyers employed in loading and unloading ships.

My object is to provide certain improvements in the general construction of cargo-conveyers and also to provide improvements in details of the construction to adapt the conveyer for use more especially in loading and unloading packages.

The construction illustrated in the accompanying drawings is of a cargo-conveyer devised more especially for loading packages of wood-pulp or the like into ships from wharves or lighters. In practice the conveyer mechanism when not in use is stored upon a barge or dock, which it is not thought necessary to illustrate in the present connection. The barge or dock is provided with a derrick suitable for handling and placing the conveyer sections or members in position upon a ship and for removing the conveyer therefrom when it has done its work.

The principal features of novelty reside in a portable support for the conveyer-sections, with means for leveling it upon the deck of a ship, the support carrying the electric motor or other power mechanism for operating the package-conveyers and having means in combination for holding the conveyer-sections in mutually coöperating relation during the rocking movement, &c., of the ship.

Referring to the drawings, Figure 1 is a cross-section of a ship and a lighter at the side thereof and showing my improved cargo-conveyer in position to transfer packages from the lighter into the hold of the ship; Figs. 2 and 3, enlarged broken plan views of the main supporting-frame and conveyers thereon, the mast shown in Fig. 1 being purposely left out of Fig. 3 to avoid confusion; Fig. 4, a broken and enlarged end view of the conveyer, showing the mast and a part of the outboard elevator, certain details of construction being left out to avoid covering features which would otherwise be hidden; Fig. 5, an enlarged broken section taken on line 5 in Fig. 3 at the lower end portion of the outboard elevator; Fig. 6, a broken section taken on line 6 in Fig. 5; Fig. 7, an enlarged broken section taken on line 7 in Fig. 3 at the upper end of the outboard elevator where it joins the horizontal conveyer-section; Fig. 8, a broken section taken on the irregular line 8 8 in Fig. 7; Fig. 9, an enlarged broken section of the upper end portion of the hatchway-elevator, the section being taken on line 9 in Fig. 1; Fig. 10, an enlarged broken section taken on line 10 in Fig. 2, illustrating a universal-joint connecting means between the support and horizontally-disposed conveyer-section; Fig. 11, a broken section taken on line 11 in Fig. 10; Fig. 12, a broken plan view of the pivotal support shown in Figs. 10 and 11; Fig. 13, an enlarged section taken on line 13 in Fig. 2 and illustrating clutch mechanism forming part of the raising and lowering means for the outboard elevator; Fig. 14, a plan view of the mechanism shown in Fig. 13; Fig. 15, an enlarged section taken on line 15 in Fig. 3 and showing one of a pair of adjusting-screws for positioning the outer end of the conveyer-support; Fig. 16, a broken section taken on line 16 in Fig. 15; Fig. 17, a broken section taken on line 17 in Fig. 2 and showing one of a pair of holddown clamping devices for the conveyer-support, and Fig. 18 a front view of one of the guards shown in Fig. 1.

The main features of my improved cargo-conveyer are a conveyer-support A, a horizontally-disposed conveyer-section B, an outboard conveyer-section or elevator C, and a hatchway conveyer-section or elevator D, all of which may be placed upon the ship in the order named to occupy the relative positions shown in Fig. 1. It may be stated at this point that in the construction illustrated in Fig. 1 packages carried by the lighter Z placed against the lower end of the outboard elevator C are lifted by traveling flights and transferred automatically onto the conveyer-section B. Endless series of traveling flights on this section move the packages to and discharge them onto descending flights carried by the hatchway-elevator, whereby they are transferred into the hold of the ship. Power for moving the flights or package-conveyers is supplied by an electric motor E on the supporting-frame, the gearing between the conveyer-sections being such that the endless series of flights or conveyers of the different sections move at the same speed.

The support A is a skeleton frame formed, preferably, of structural steel, with the side beams $a\ a'$, end beams $b\ b'$, and cross beams and braces suitably disposed to give the desired strength and form supports for the electric motor and other parts, as hereinafter described. When placed in position upon the ship, the support A rests across the hatchway, as shown, and projects, preferably, at its outer end beyond the ship's side. Slidably fastened to the side beams $a\ a'$ of the support are holddown-clamps F of the construction shown in Fig. 17, comprising each an outer cylinder or box $c$, with means for hooking it onto the side beam, a screw $c'$, extending downward through the top of the cylinder and operated by a handwheel $c^2$, and a sliding nut or yoke $c^3$, threaded at its upper end to receive the screw $c'$ and carrying at its lower end a chain $c^4$, provided with a hook $c^5$. To fasten down the support, the hooks $c^5$ of the holddown-clamps are passed under the lower edges of the combing of the hatchway, and the screw $c'$ is turned to raise the yoke $c^3$ and tighten the chain. Near its outer end the support is provided with downward-extending legs $d$, connected at their lower ends by cross-extending channel-bars $d'$, the legs being reinforced by braces $d^2$, as shown in Fig. 1. The channel-bars $d'$ at their outer ends form supports for internally-threaded blocks $d^3$, (see Fig. 15,) through which pass jack-screws $d^4$, operated by hand-wheels $d^5$. The jack-screws rest at their lower ends upon the deck of the ship, leveling and supporting the frame A and also taking the weight thereof from the gunwale or upper edge of the side of the ship.

G is a frame or mast of the construction shown in Figs. 1 and 4, formed with two side bars or legs $e$, pivotally connected at their lower ends to the side bars $a\ a'$ by means of pins or bolts $e'$. The legs are trussed, as shown in Fig. 1, and the frame may be held in an upright position by props G', also pivoted at their lower ends to the side bars $a\ a'$. The props are fastened at opposite ends by removable pins or bolts, so that they may be disconnected at one end to permit the mast to swing on the pivots $e'$ to fold against the support A when not in use. The mast-frame G is constructed with braces and cross-beams forming sheave-supports, as hereinafter described. Also upon the mast in the positions shown are downward-extending bifurcated guides $G^2$ for the purpose hereinafter explained.

The outboard elevator C is formed with parallel side frames, each consisting of parallel channel-bars $f\ f$, fastened together by braces, struts, and ties, the side frames being secured together by suitably-disposed anglebars $f'$ and cross-plates, &c., which where necessary for a clear understanding will be hereinafter referred to. The ends of the elevator-frame are rounded, as indicated, and near the lower end, journaled in longitudinally-sliding boxes $f^2$ on the outer sides thereof, is a cross-shaft $g$, carrying companion sprocket-wheels $g'$. The boxes $f^2$ are on the ends of screws $f^3$, passing through ears $f^4$ on the side frames, this construction forming a means common in mechanics for taking up the slack in belts. Between the side frames and in a plane about midway between the channel-bars $f\ f$ is a floor consisting, preferably, of parallel pipes C', suitably fastened in place, as indicated. Journaled in the side frames of the elevator, near the upper ends thereof, is a cross-shaft $h$, carrying toward opposite ends sprocket-wheels $h'$ in line with the sprocket-wheels $g'$ at the other end. Extending around the sprocket-wheels are companion conveyer-chains $C^2$, connected together at intervals by cross-bars or flights $C^3$. Mounted in the frame between the sprocket-wheels $h'$ are side plates $i$, supporting between them a platform or casting $i'$, presenting, preferably, a corrugated upper face, as indicated in Fig. 8. The upper ends of the pipes C' extend to the platform-frame, as shown in Fig. 7, at one side of the plane of the shaft $h$. Extending through and beyond opposite sides of the elevator-frame in the position shown, near the upper end thereof, is a shaft or stop $C^4$, adapted to rest upon center parallel beams of the support A, as shown in Fig. 4, to sustain the elevator when in its lowermost position. Also midway between the ends of the elevator is a similar shaft $C^5$. On the upper end of the sides of the elevator-frame are head-plates $C^6$, formed with companion projecting-arm portions $C^7$, carrying split boxes $C^8$, having means of common construction for fastening the sections of the split boxes together.

The conveyer-section B is also formed with side frames, consisting, as shown in Fig. 7, of upper and lower parallel channel-bars $k\ k'$, with a lower bar $k^2$ fastened against the channel-bar $k'$ and on which the carrier-section rests when upon the floor. The construction of the carrier B is similar in all essential particulars to the construction shown, described, and claimed in a separate concurrent application for Letters Patent filed by me on the 8th day of August, 1904, and bearing serial number 219,897. It is provided at opposite ends with shafts B' $B^2$, carrying sprocket-wheels $l$, over which run the companion endless chains $B^3$, formed, as shown in Fig. 7, of heads $m$ and links $m'$, pivotally connected together. Tubes $m^2$, extending across the conveyer, are connected at their opposite ends with the heads of the respective chains, shafts being journaled in the tubes and extending at their ends into the channel or guide bars $k\ k'$.

Mounted on a pair of cross-beams $a^2$, forming a part of the construction of the supporting-frame A, is a plate $n$, on which is pivotally fastened a turning-block $n'$, held in place by a bolt $n^2$, to which the block is pivotally secured. On the block is a pair of bearing-ears $n^3$ to receive the pin $n^4$. Fastened to the side frames of the conveyer B, in the position shown, which is near the inner end of the conveyer, are plates $p$, forming bearings for a shaft $p'$. Pivotally connected with the ends of the shaft $p'$ is a yoke $p^2$, extending across the under side of the conveyer and provided beneath the central line of the conveyer with a sleeve portion $p^3$, fitting removably between the ears $n^3$. The sleeve-opening receives the pin $n^4$, and the conveyer-section is removably secured thereby to the support A. The connection described permits the conveyer to rock in the vertical plane on the shaft $p'$, the yoke to rock in the direction at right angles thereto on the pin $n^4$, and the yoke, with the conveyer, to turn from side to side on the plate $n$, all these parts contributing to form a universal joint between the support and inner end portion of the conveyer-section. On the block $n'$ are lugs $n^5$, Fig. 12, and between the same is a stop $n^6$ on the plate $n$, which stop $n^6$ limits the turning of the block on the plate. Connected with the end of the frame of the conveyer B is an inclined plate or chute $q$, which is shown in Fig. 1, but left out of Fig. 2 to avoid confusion.

The hatchway-elevator D is constructed for the most part like the elevator C and is supported by a cross-shaft $r$, Fig. 9, in every respect like the shaft $C'$ of the outboard elevator. Centrally between the ends of the frame is a similar shaft $r'$ corresponding with the shaft $C^5$ of the outboard elevator. The upper sprocket-wheel shaft $s$ of the hatchway-conveyer is geared by gear-wheels $s'$ at opposite sides of the frame to gears $s^2$ $s^2$ on a shaft $s^3$, mounted in extension-bearings $s^4$ on the frame. The shaft $s^3$ carries a sprocket-wheel $s^5$.

Belted to the electric motor E is a shaft $t$, carrying sprocket-wheels $t'$ $t'$ in the positions shown in Fig. 2. A counter-shaft $v$, journaled in the frame, carries a sprocket-wheel $v'$, driven from one of the sprocket-wheels $t'$, as shown, and also a sprocket-pinion $v^2$. Journaled in the frame of the support A in the position shown in Fig. 2 is a fixed shaft $w$. On the shaft $w$ (see Figs. 13 and 14) is a rotary sleeve $w'$, carrying a sprocket-wheel $w^2$ and a sprocket-pinion $w^3$. The sprocket-wheel $w^2$ is driven from the sprocket-pinion $v^2$. Also loose upon the shaft $w$ is a sleeve $w^4$, carrying a sprocket-pinion $w^5$. On the sleeve $w^4$ is a sliding clutch member $w^6$, keyed to the said sleeve and movable into and out of engagement with a clutch member $w^7$ integral with the sleeve $w'$. The sliding clutch is worked by a clutch-lever $w^8$, having a handle $w^9$.

As before stated, the outboard elevator C may rest pivotally upon the support A at either the shaft $C^4$ or $C^5$. The mast construction G is there for the purpose of carrying raising and lowering mechanism for the outboard elevator. The mechanism comprises a shaft 18, journaled in the frame of the support A, in the position shown in Fig. 2, and provided at opposite ends with hand-wheels 19 19. The shaft also carries worms 20 20, meshing with worm-wheels 21, Fig. 1, on vertically-disposed drums 22 22, also journaled in the frame of the support A. Fastened at opposite ends, respectively, to the drums 22 is a cable 23, which runs beneath sheaves 24, over sheaves 25 on the mast-frame, under sheaves 26 on a shaft $C^9$ on the outboard elevator, thence up over sheaves 27 on the mast-frame, the center of the length of the cable 23 being between the sheave 27, as indicated in Fig. 4. Turning of the shaft 18 by means of the handles 19 rotates the drums 22 to draw or let out the cable 23 to raise or lower the outboard elevator in a manner that will be readily understood. If it is desired to raise or lower the outboard elevator by power from the electric motor E when running, the handle $w^9$ may be operated to throw the clutch members $w^6$ $w^7$ into engagement. The sprocket-pinion $w^5$ is geared by a chain 28 to a sprocket-wheel on the shaft 18, as indicated in Fig. 2.

The sprocket-pinion $w^3$ is connected, by means of a drive-chain, as shown, to a sprocket-wheel 29 on the shaft $B^2$ of the conveyer-section B, and sprocket-wheels 30 30 on the conveyer-shaft $B'$ are geared, by means of drive-chains 31 31, to sprocket-wheels 32 32 on the shaft $h$ of the outboard elevator.

One of the sprocket-wheels $t'$ on the shaft $t$ is connected, by means of a drive-chain, as shown in Fig. 2, to a sprocket-wheel 33 on a shaft 34, journaled in the supporting-frame A. The shaft 34 also carries a sprocket-pinion 35, connected, by means of a drive-chain, with the sprocket-wheel $s^5$ on the shaft $s^3$.

It will be understood from the foregoing that the traveling-conveyer mechanism of the conveyer-section B is driven from the sprocket-pinion $t'$ at one end of the shaft $t$ and the hatchway-conveyer D is driven from the sprocket-pinion $t'$ at the other end of the shaft $t$ and that the conveyer mechanism of the outboard elevator C is driven from the conveyer B. The gearing throughout is such that all the said conveyer mechanisms are driven at the same speed.

In operation a package placed against the lower end portion of the floor $C'$ of the outboard elevator is engaged by a flight $C^3$ and moved up the floor to the shaft $h$. Here the package turns by gravity over the shaft $h$ onto the platform $i'$ and is pushed along by the continued engagement of the flight $C^3$ and deposited onto the traveling conveyer of the section B. It is moved by the conveyer to the opposite end of the section B and is discharged therefrom onto the chute $q$, which guides it against the floor of the hatchway-conveyer D, where it will rest upon a descending flight and be lowered into the hold of the ship. Packages one by one in rapid succession may thus be transferred from the lighter Z and stored in the hold.

The lower end of the outboard elevator may rest upon the lighter, as shown in Fig. 1. In the rocking of the boats with relation to each other the outboard elevator may rise and fall, the outer end of the conveyer-section B rising and falling with it. The universal-joint mechanism (shown in Figs 10, 11, and 12) permits the conveyer-section B to move freely without interfering with any of the driving connections. When one lighter is being replaced by another, for example, the outboard elevator may be raised to a high position to be out of the way, causing the ends of its shaft $C^9$ to enter the bifurcated guides $G^2$ to steady it in its raised position. The outboard elevator and outer end portion of the conveyer-section B are sustained for the most part by the cable 23, and in any longitudinal backward and forward play between the ship and lighter while the elevator rests in contact with the latter the cable 23 in moving back and forth over the pulleys 27 will maintain its tension. As the ship descends under the weight of its cargo the outboard elevator, and consequently the outer end of the conveyer-section B, may be raised by turning the shaft 18, as before described, and when desired the outboard elevator may rest at its shaft $C^5$ upon the end portion of the support A. When the lower part of the hold of the ship has been loaded, the leg or hatchway elevator D may be raised until it rests at its shaft $r'$ on the support. The drive-chain at the sprocket-wheel 33 is of a common construction to be readily separable and may be substituted by a longer chain when the elevator is in the raised position.

On the outboard elevator I have shown guards 35 and 36, both constructed as shown in Fig. 18. Each comprises a rectangular frame formed with parallel slats or pipes held together and curved outward at their lower ends. They are pivotally connected at opposite sides by links 37 with the sides of the elevator-frame, each after the manner of a parallel rule. They tend to swing by gravity downward against the elevator, but are swung to raised positions, as shown, by the pressure of the packages being raised by the flights. The guards thus operate to hold the packages against the elevator-floor described.

As before stated, the package-moving conveyers are geared with relation to each other to move at the same speed. Therefore it is an easy matter to adjust them, as they are placed in position so that a descending flight of the hatchway-elevator will in each instance be in proper position to receive a package that has been delivered to the horizontal or intermediate conveyer by the outboard elevator. When the first package has reached the lower end of the hatchway-elevator, the weight of the packages descending on the latter will tend to balance the weight of the packages rising on the outboard elevator. Thus the running of the package-conveyers requires comparatively little power.

Various modifications of the construction shown and described may be made without departing from the spirit of my invention as defined by the claims.

What I claim as new, and desire to secure by Letters Patent, is—

1. In a cargo-conveyer, the combination of a support, a conveyer-section pivotally mounted toward its inner end upon said support to rock and swing laterally and vertically thereon, an outboard elevator pivotally connected with the outer end portion of said conveyer-section, and driving means for the said conveyer-section and elevator.

2. In a cargo-conveyer, the combination of a portable conveyer-supporting frame adapted to rest upon a ship's deck and extend at one end portion over a hatchway, with its other end adjacent to the ship's side, a conveyer-section, a universal-joint connection between the supporting-frame and said conveyer-section on which the said section is supported toward its inner end, an outboard elevator toward one end of the support at the outer end of said conveyer-section, a hatchway-elevator toward the other end of the support at the inner end of said conveyer-section, and driving means on the support for the said conveyer-section and elevators.

3. In a cargo-conveyer, the combination of a portable conveyer-supporting frame adapted to rest upon a ship's deck and extend at one end portion over a hatchway, with its other end adjacent to the ship's side, a conveyer-section pivotally mounted toward its inner end upon said support to swing laterally and vertically and rock thereon, an outboard elevator pivotally connected at its upper end with the outer end of said conveyer-section, means on the support for raising and lowering the outboard elevator and said conveyer on its pivot, a hatchway-elevator on the support at the inner end of said conveyer-section, and driving means on the support for the said conveyer-section and elevators.

4. In a cargo-conveyer, the combination of a portable conveyer-supporting frame adapted to rest upon a ship's deck and extend at one end portion over a hatchway, with its other end adjacent to the ship's side, a conveyer-section pivotally mounted toward its inner end upon said support to swing laterally and vertically and to rock thereon, an outboard elevator pivotally connected with the outer end of said conveyer-section, a hatchway-elevator connected with the support at the inner end of said conveyer-section, raising and lowering means on the support for said elevators and conveyer-section, and an electric motor on the support connected, in driving relation, with the said conveyer-section and elevators.

5. In a cargo-conveyer, the combination with a conveyer-section, an outboard elevator pivotally connected at its upper end with the outer end of said conveyer-section and a hatchway-elevator at the inner end of said conveyer-section, of a portable supporting-frame on which said conveyer-section is pivotally mounted, provided with means for securing it removably and leveling it upon a ship's deck.

6. In a cargo-conveyer, the combination with a conveyer-section communicating at opposite ends respectively with an outboard elevator and a hatchway-elevator, of a support for the same on which the said conveyer-section is pivotally mounted, and adjusting-screws on the support for leveling it upon the deck of a ship.

7. In a cargo-conveyer, the combination with a conveyer-section communicating at opposite ends respectively with an outboard elevator and a hatchway-elevator, of a support for the same on which the said conveyer-section is pivotally mounted, and adjustable holddown-clamps on the support provided with means for engaging the hatchway-combing.

8. In a cargo-conveyer, the combination with a conveyer-section communicating at opposite ends respectively with an outboard elevator and a hatchway-elevator, of a support for the same on which the said conveyer-section is pivotally mounted, and a mast on the support carrying raising and lowering means for the outboard elevator.

9. In a cargo-conveyer, the combination with a conveyer-section communicating at opposite ends respectively with an outboard elevator and a hatchway-elevator, of a support for the same on which the said conveyer-section is pivotally mounted, and a folding mast pivotally mounted upon the support, and carrying raising and lowering means for the outboard elevator.

10. In a cargo-conveyer, the combination with a conveyer-section, communicating at opposite ends respectively with an outboard elevator and a hatchway-elevator, of a support for the same on which the said conveyer-section is pivotally mounted, a mast on the outer end portion of the support, carrying raising and lowering means for the outboard elevator, and outboard-elevator engaging and steadying guides on the mast.

11. In a cargo-conveyer, the combination with a conveyer-section, communicating at opposite ends respectively with an outboard elevator and a hatchway-elevator, of a support for the same on which the said conveyer-section is pivotally mounted, endless package-conveyers forming parts of the said section and elevators, a power device on the support geared in driving relation with the endless package-conveyers of the hatchway-elevator and said conveyer-section, and a driving connection between the package-conveyer of the said section and outboard elevator.

12. In a cargo-conveyer, the combination with a conveyer-section communicating at opposite ends respectively with an outboard elevator and a hatchway-elevator, of a support for the same on which the said conveyer-section is pivotally mounted, a power device on the support geared in driving relation with the said conveyer-section and elevators, raising and lowering mechanism on the support for the said outboard elevator, and means for throwing said mechanism into and out of driving relation with the said power device.

13. In a cargo-conveyer, the combination of a portable conveyer-supporting frame adapted to rest upon a ship's deck, a conveyer-section, and universal-joint connecting means between the said support and section comprising a horizontally-turning block pivotally secured to the support, and a yoke pivotally connected with the said block beneath the center of said conveyer-section and pivotally connected with the said conveyer-section at opposite sides thereof, substantially as and for the purpose set forth.

14. In a cargo-conveyer, the combination of a portable conveyer-supporting frame adapted to rest upon a ship's deck, a conveyer-section connected toward its inner end by a universal joint with the said support, an outboard elevator pivotally connected at its upper end portion with the outer end portion of said conveyer-section, a mast-frame on the said support and means for raising and lowering the outer end portion of the conveyer-section and the outboard elevator, comprising drum mechanism on the said support, with means for turning it, a cable connected at opposite ends with the said drum mechanism, sheaves on the mast-frame over which the opposite lengths of the cable run from the drum mechanism to the upper end portion of the outboard elevator, sheaves on the said upper end portion under which the cable-lengths extend, and sheaves on the mast over which the cable, between its said lengths, extends, substantially as and for the purpose set forth.

15. In a cargo-conveyer, the combination of a conveyer-section provided with an endless traveling package-conveyer, an outboard elevator having side frames, upper and lower shafts with sprocket-wheels thereon, a centrally-extending floor and endless flight carrying-chains running over said sprocket-wheels, means connecting the upper end of the outboard elevator with the outer end of the said conveyer-section, driving means for the said section and elevator, and a platform in the upper end portion of the outboard-elevator frame, the parts being so constructed with relation to each other that packages raised by the flights of the outboard elevator will be turned upon said platform and pushed by the flights from the said platform onto the said conveyer-section, substantially as and for the purpose set forth.

CHARLES H. ANDERSON.

In presence of—
WALTER N. WINBERG,
F. M. WIRTZ.